United States Patent
Uchiyama

(10) Patent No.: US 8,952,332 B2
(45) Date of Patent: Feb. 10, 2015

(54) RADIATION IMAGING APPARATUS AND CONTROL METHOD

(75) Inventor: Akehiko Uchiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 13/285,106

(22) Filed: Oct. 31, 2011

(65) Prior Publication Data

US 2012/0132810 A1    May 31, 2012

(30) Foreign Application Priority Data

Nov. 29, 2010    (JP) ................................. 2010-265430

(51) Int. Cl.
*G01T 1/16* (2006.01)
*H04N 5/32* (2006.01)
*H04N 5/361* (2011.01)

(52) U.S. Cl.
CPC . *H04N 5/32* (2013.01); *H04N 5/361* (2013.01)
USPC .................................. 250/358.1; 250/370.08

(58) Field of Classification Search
CPC .................................... G01T 1/16; H04N 5/32
USPC .............................. 250/358.1, 370.08, 370.09
See application file for complete search history.

(56) References Cited

U.S. PATENT DOCUMENTS

| | | | | |
|---|---|---|---|---|
| 7,683,328 | B2 | 3/2010 | Tsuchiya | 250/354.1 |
| 7,832,928 | B2 | 11/2010 | Topfer et al. | 378/207 |
| 7,994,481 | B2 | 8/2011 | Yagi et al. | 250/370.09 |
| 2002/0190215 | A1 | 12/2002 | Tashiro et al. | 250/370.11 |
| 2003/0086523 | A1 | 5/2003 | Tashiro et al. | 378/19 |
| 2005/0058252 | A1 | 3/2005 | Yamada | 378/114 |
| 2007/0291904 | A1 | 12/2007 | Takenaka et al. | 378/207 |

FOREIGN PATENT DOCUMENTS

| | | |
|---|---|---|
| CN | 1764244 | 4/2006 |
| CN | 101088463 | 12/2007 |
| CN | 101234025 | 8/2008 |
| CN | 101345816 | 1/2009 |
| CN | 101683269 | 3/2010 |
| JP | 2002-369084 | 12/2002 |
| JP | 2005-087254 | 4/2005 |
| JP | 2009-204310 | 9/2009 |

OTHER PUBLICATIONS

Office Action issued Nov. 5, 2013 in counterpart Chinese patent application 201110252182.X, with translation.
Office Action issued Dec. 16, 2013 in counterpart Korean patent application 10-2011-121534, with translation (Office Action submitted previously).
Office Action issued May 23, 2014 in counterpart Japanese patent application 2010-265430, with translation.

*Primary Examiner* — David Porta
*Assistant Examiner* — Faye Boosalis
(74) *Attorney, Agent, or Firm* — Fitzpatrick, Cella, Harper & Scinto

(57) ABSTRACT

A radiation imaging apparatus connected to a radiation generation apparatus which generates radiation and a sensor which accumulates a charge corresponding to an irradiating dose on a detection surface acquires a radiation image by driving the sensor upon generation of radiation by the radiation generation apparatus and acquires a dark image by driving the sensor without generation of radiation by the radiation generation apparatus. The radiation imaging apparatus adjusts a driving timing of the sensor so as to set a time difference between two starts of reading charge from the sensor to acquire the radiation image and reading charge from the sensor to obtain the dark image to an integer multiple of a predetermined time.

24 Claims, 9 Drawing Sheets

F I G. 8
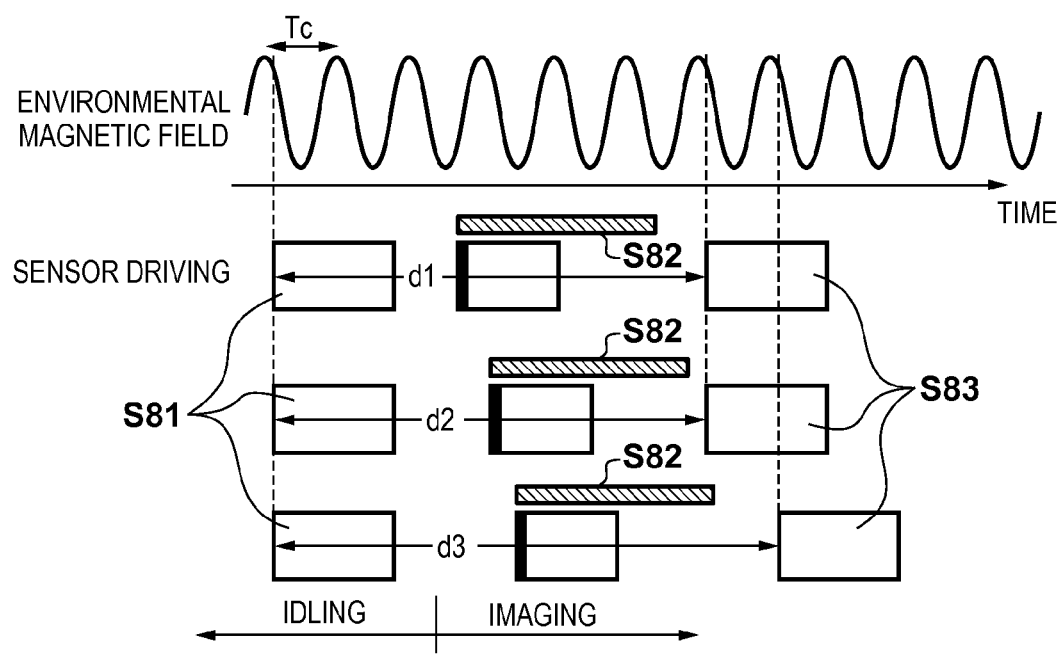

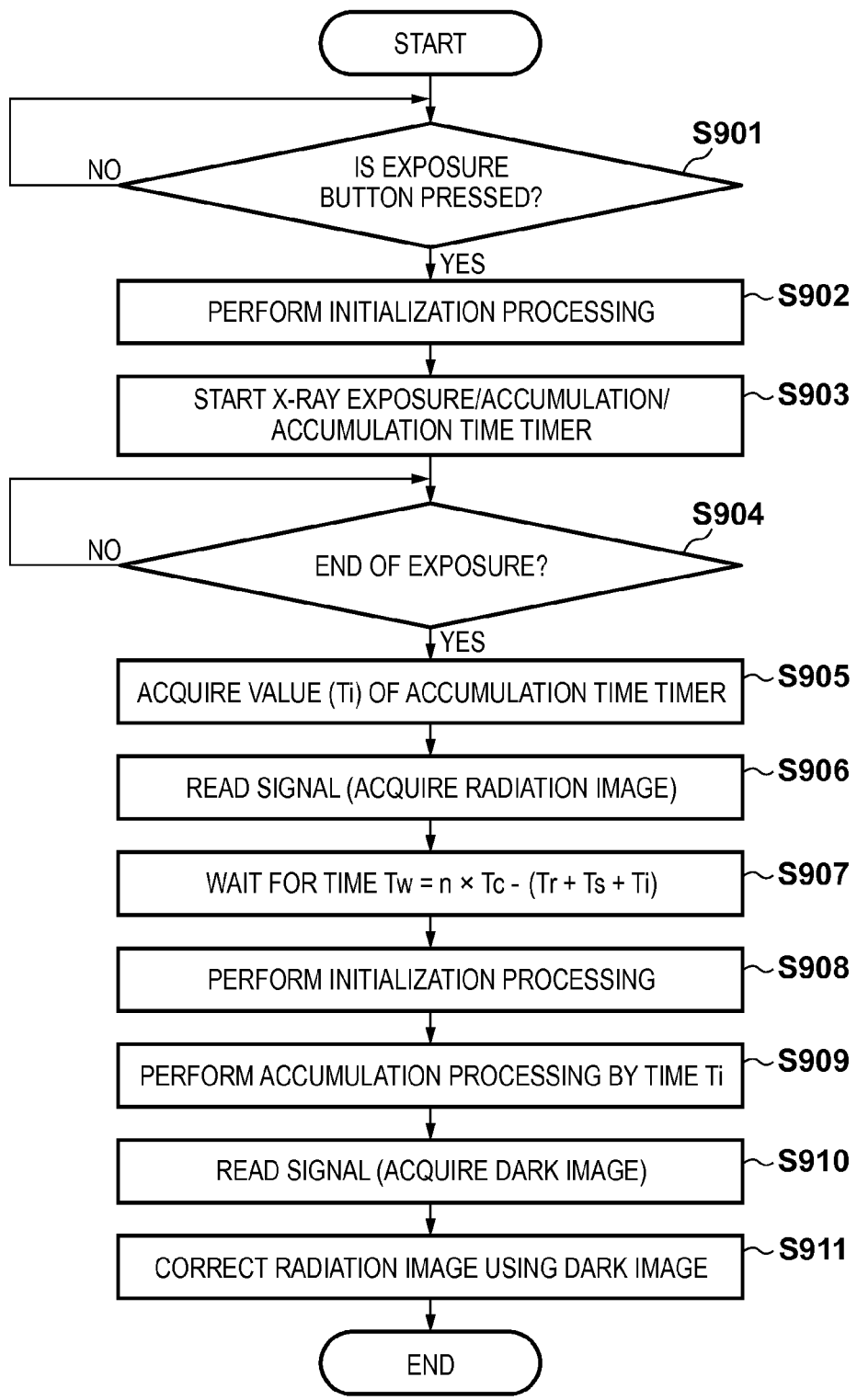

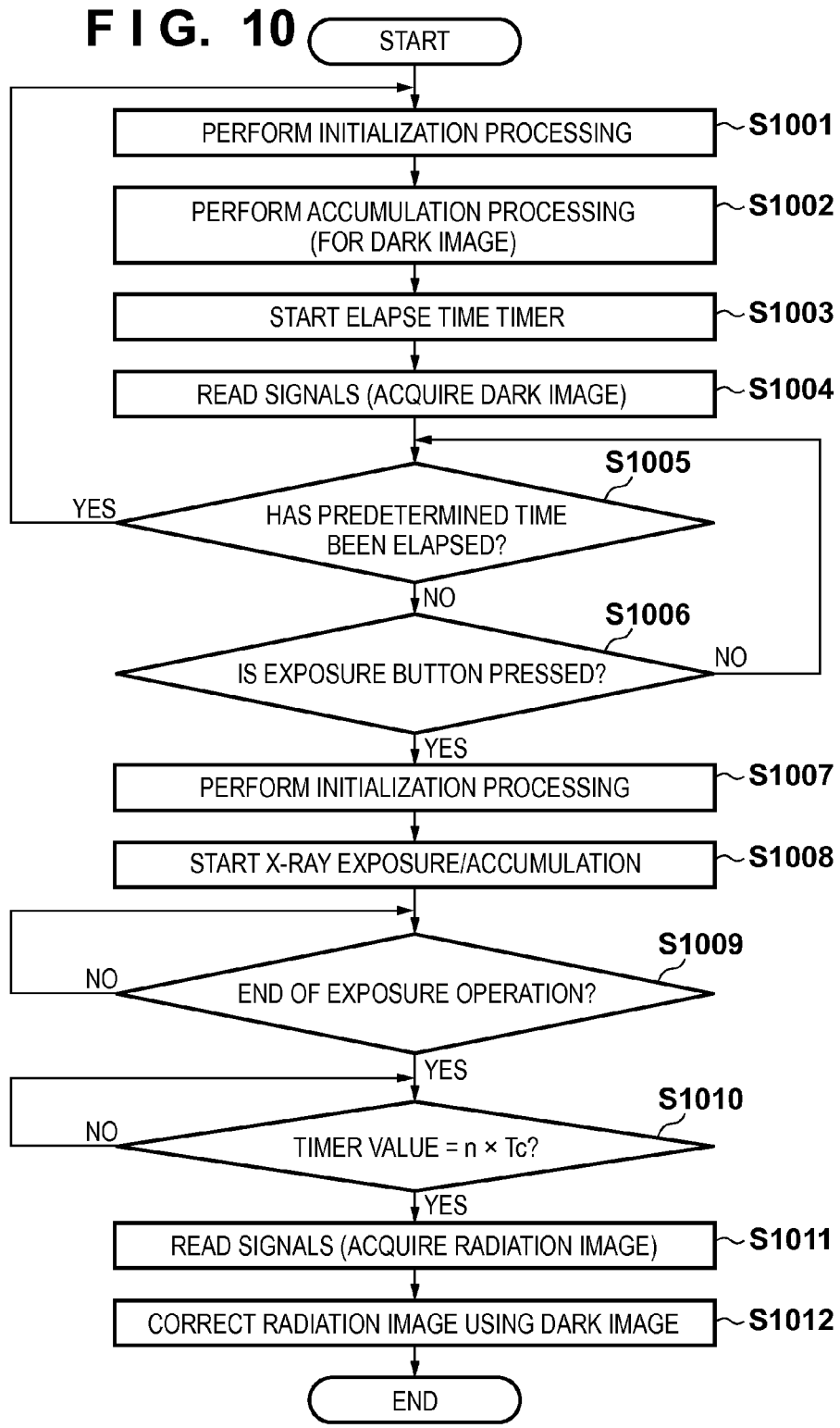

RADIATION IMAGING APPARATUS AND CONTROL METHOD

BACKGROUND OF THE INVENTION

1. Field of the Invention

The present invention relates to a radiation imaging apparatus and its control method.

2. Description of the Related Art

Recently, there is known a radiation imaging apparatus using flat panel type sensor including a sensor array having a two-dimensional array of sensors (to be referred to as pixels hereinafter) each constituted by a conversion element for converting radiation into a signal charge (electrical signal) and a switch element such as a TFT for transferring the electrical signal to the outside. An amorphous silicon or polysilicon film formed on a glass substrate is used for a conversion element. In general, such a radiation imaging apparatus transfers the signal charge converted by the conversion elements to a reading apparatus by performing matrix driving using switch elements such as TFTs, thereby performing reading operation.

Upon application of radiation, each conversion element on the sensor array directly or indirectly generates a signal. In a sensor based on a system that directly generates signals, the conversion element of each pixel detects visible light converted by the phosphor instead of directly detecting radiation. In either a sensor based on the direct system or a sensor based on the indirect system, each pixel undesirably generates some signals even without application of radiation. Such a signal will be referred to as a dark current. Dark currents have different characteristics on the respective pixels on the array, and change with changes in the temperature of the sensor or over time.

Each pixel generates a dark current upon application of radiation in the same manner as when no radiation is applied. It is therefore possible to remove the influence of a dark current on an image by calculating the difference between a signal from each pixel with application of radiation and a signal from each pixel irradiated without application of radiation (Japanese Patent Laid-Open No. 2002-369084 (to be referred to as literature 1). That is, this technique separately acquires an image (to be referred to as a radiation image hereinafter) obtained by scanning the sensor array with application of radiation and an image (to be referred to as a dark image hereinafter) obtained by scanning the sensor array without application of radiation. The technique then obtains an image of the object by performing subtraction processing between the corresponding pixels of these images. Note that in order to prevent the occurrence of removal residues due to changes in dark current characteristic itself as described above, it is preferable to acquire a radiation image and a dark image in temporal vicinity to each other.

An imaging procedure in a general radiation imaging apparatus will be described with reference to FIGS. 1 and 2. When the user inputs an imaging trigger to the apparatus by pressing a hand switch to perform imaging, the apparatus performs initialization operation (S1) for the sensor array first. In this case, the apparatus sweeps the dark currents accumulated in the sensor before imaging, and makes adjustment to allow the sensor to properly perform photoelectric conversion. Sweeping of dark currents in initialization operation is similar to reading of images in terms of performing scanning operation of sequentially turning on the TFTs on the respective rows on the sensor array. However, this operation does not perform A/D conversion. In this case, therefore, no image data is generated.

Upon completion of initialization operation, the apparatus turns off all the TFTs on the sensor array to make the respective pixels independently ready for photoelectric conversion. In this case, this state is called an accumulation state (S2). When the sensor array is set in an accumulation state, the apparatus irradiates the object with radiation (S7). This makes the respective pixels on the sensory array convert the gradation information of radiation transmitted through an object into charge. This charge is accumulated in each pixel until the subsequent reading/scanning. At this time, each pixel has generated the dark current described above independently of radiation/charge conversion. As a consequence, a sum of the image and the dark current is accumulated in each pixel.

The end of application of radiation is determined based on various factors. Simply, the apparatus finishes the application of radiation when an irradiation time set in advance has elapsed. A more preferable system is designed to make a radiation measuring apparatus called a phototimer stop the application of radiation when the total dose of radiation which has reached the sensor reaches a given value. In any system, when the user expresses his/her intention to stop the application of radiation (for example, releases the exposure switch), the apparatus accepts the intention with the top priority. As described above, although it is not possible to determine when to finish the application of radiation, the apparatus finishes the application of radiation when the above conditions are satisfied.

Upon completion of application of radiation, the apparatus immediately reads signals (charge stored in S2) from the sensor array (S3). In reading operation, the apparatus turns on the TFTs on the respective rows on the sensor array to sample and hold charge signals transferred to the respective column signal lines and perform A/D conversion, thereby obtaining digital data corresponding to the pixels on the respective rows. In addition, sequentially scanning the rows of the TFTs which are turned on will obtain digital data from the overall two-dimensional sensor array.

In this case, the image data obtained by reading operation after the application of radiation, that is, a radiation image 10 shown in FIG. 2, is a sum of the halftone information of radiation and dark currents from the respective pixels of the array, as described above. Note that reading signals from the sensor array immediately after the application of radiation is effective in reducing the proportion of dark currents in the image and reducing residues in the subtraction processing to be described later. This operation also has an effect of shortening the delay time until the image is presented to the user.

Although the radiation image is acquired in the steps so far, the process enters the step of acquiring a dark image to remove dark current components from the radiation image. The apparatus starts dark image acquisition by performing initialization operation (S4) again immediately after reading the radiation image. Upon performing initialization operation again, the sensor array is set in an accumulation state (S5) again. The purpose of this accumulation state is to acquire a dark image from the sensor array. Therefore, the apparatus applies no radiation. The apparatus controls the duration of the accumulation state in dark image capturing so as to make it equal to "duration of accumulation state (S2) in radiation image capturing". Note that in radiation image capturing, the duration of an accumulation state is determined on site but is not known in advance, whereas the accumulation time of dark image capturing will have been determined at the start of an accumulation state.

When a predetermined accumulation time has elapsed, the apparatus reads signals from the sensor array (S6). The reading method to be used is the same as that used to read the radiation image. The image obtained here is called a dark image 11 (FIG. 2). The apparatus has acquired the radiation image 10 and the dark image 11 in the steps so far. As described above, the dark current components superimposed on the radiation image 10 are almost identical to the dark image 11. To obtain a final captured image 12, therefore, the dark image 11 is subtracted from the radiation image 10. The above imaging procedure is described in literature 1.

In the above case, the apparatus executes the dark image acquisition step immediately after the radiation image acquisition step in order to match the accumulation time for a radiation image with that for a dark image and set a minimum necessary accumulation time. Depending on the characteristics of a sensor array and correction based on calculation, it is not necessary to match accumulation times. In such a case, it is possible to use a method in which the dark image acquisition step is set at any position other than after the radiation image acquisition step.

For example, there has been proposed an imaging procedure performed in the following steps. First of all, the apparatus periodically and repeatedly acquires dark images in a waiting state, writes the acquired dark images in a memory, and updates the old dark images. Therefore, latest dark images always exist in the dark image memory. When the user inputs an imaging trigger to the apparatus by, for example, pressing a hand switch for the execution of imaging, the apparatus executes the radiation image acquisition step. When obtaining a captured image, the apparatus subtracts a dark image from a radiation image. At this time, the apparatus corrects the dark image based on calculation, as needed.

Some apparatus obtains two types of captured images by combining them. That is, this apparatus obtains a captured image for immediate display by using a dark image acquired in a waiting state, and obtains a high-quality captured image by using a dark image acquired after the acquisition of a radiation image. In some cases, in such apparatuses, the resolution of a captured image for immediate display differs from that of a high-quality captured image.

A sensor array for radiation imaging must have a physical size almost equal to that of an object. For example, a sensor array designed for imaging the human body has a size of about 40 cm×40 cm. When a magnetic field is externally applied to an array wiring of this size, the array wiring itself operates as a sensitive magnetic field sensor.

A typical source which emits a variable magnetic field to an environment is an AC power source wiring for house facilities. When an AC power source current flows in the power source wiring, AC magnetic fields are generated around the wiring. The closer to the power source wiring, the larger the magnetic field generated in a space. In addition, the larger the power consumption of a device which receives power from the wiring, the larger the magnetic field generated. As a consequence, when a power source wiring which carries a large amount of power is placed near an imaging apparatus, a change in magnetic field crossing the sensor array during the reading operation of the array may be superimposed on an image, resulting in an artifact. This operation will be described below with reference to FIGS. 3 and 4.

As described above, when obtaining a captured image, the apparatus acquires a radiation image and a dark image and subtracts them from each other. The apparatus acquires each image by performing initialization, accumulation, and reading. Of these operations, initialization and accumulation are done without amplification and A/D conversion, and hence a magnetic field has no influence on an image. In contrast to this, in reading operation, the apparatus turns on the TFTs on the respective rows on the sensor array to sample and hold charge signals transferred to the respective column signal lines. At this time, when a magnetic field crossing the sensor array varies, electromotive forces are generated in signal lines, resulting in differences between sampled and held values. This phenomenon continuously appears while the apparatus sequentially scans the respective rows. As a result, changes in magnetic field during scanning appear as a fringe pattern on an image.

Such fringe patterns are superimposed on both a radiation image 20 and a dark image 21, as shown in FIG. 4. If the fringe patterns on the two images exist in the same phase, existing subtraction processing makes them cancel out each other, resulting in no fringe pattern on the captured image. If, however, reading operations start out of phase in a fluctuation cycle of an environmental magnetic field like the reading start timings indicated by S3 and S6 in FIG. 3, the fringe patterns on the radiation image and dark image shift from each other. If fringe patterns exist in opposite phases, subtraction processing will enhance them. As a consequence, an enhanced fringe pattern appears as an artifact on the captured image. In addition, a fringe pattern as a residue is left between the two images in accordance with the phase differences. As a consequence, correcting the radiation image 20 by using the dark image 21 will obtain a captured image 22.

In general radiation imaging apparatuses, what kinds of phase differences fringe patterns superimposed on a radiation image and a dark image exhibit are completely accidental. This is because, since an accumulation time for capturing a radiation image is determined during imaging operation, it is not possible to determine in advance the time difference between reading operation for a radiation image and reading operation for a dark image.

SUMMARY OF THE INVENTION

An embodiment of the present invention provides a radiation imaging apparatus which can effectively eliminate artifacts due to the influence of an environmental magnetic field and a control method for the apparatus.

According to one aspect of the present invention, there is provided a radiation imaging apparatus connected to a radiation generation apparatus which generates radiation and a sensor which accumulates charge corresponding to an irradiating dose on a detection surface, the apparatus comprising: a first acquisition unit configured to acquire a radiation image by driving the sensor upon generation of radiation by the radiation generation apparatus; a second acquisition unit configured to acquire a dark image by driving the sensor without generation of radiation by the radiation generation apparatus; and an adjusting unit configured to adjust a driving timing of the sensor by one of the first acquisition unit and the second acquisition unit so as to set a time difference between two starts of reading charge from the sensor by the first acquisition unit and reading charge from the sensor by the second acquisition unit to an integer multiple of a predetermined time.

Also according to another aspect of the present invention, there is provided a method of controlling a radiation imaging apparatus connected to a radiation generation apparatus which generates radiation and a sensor which accumulates charge corresponding to an irradiating dose on a detection surface, the method comprising: a first acquisition step of acquiring a radiation image by driving the sensor upon generation of radiation by the radiation generation apparatus; a second acquisition step of acquiring a dark image by driving the sensor without generation of radiation by the radiation generation apparatus; and an adjusting step of adjusting a driving timing of the sensor in one of the first acquisition step and the second acquisition step so as to set a time difference between two starts of reading charge from the sensor in the first acquisition step and reading charge from the sensor in the second acquisition step to an integer multiple of a predetermined time.

Further features of the present invention will become apparent from the following description of exemplary embodiments with reference to the attached drawings.

BRIEF DESCRIPTION OF THE DRAWINGS

FIG. 8 is a view for explaining adjustment of an image reading timing according to the second embodiment;

FIG. 9 is a flowchart for explaining the operation of the radiation imaging apparatus according to the first embodiment; and FIG. 10 is a flowchart for explaining the operation of the radiation imaging apparatus according to the second embodiment.

DESCRIPTION OF THE EMBODIMENTS

A few preferred embodiments of the present invention will be described below with reference to the accompanying drawings.

First Embodiment

Figure 1:
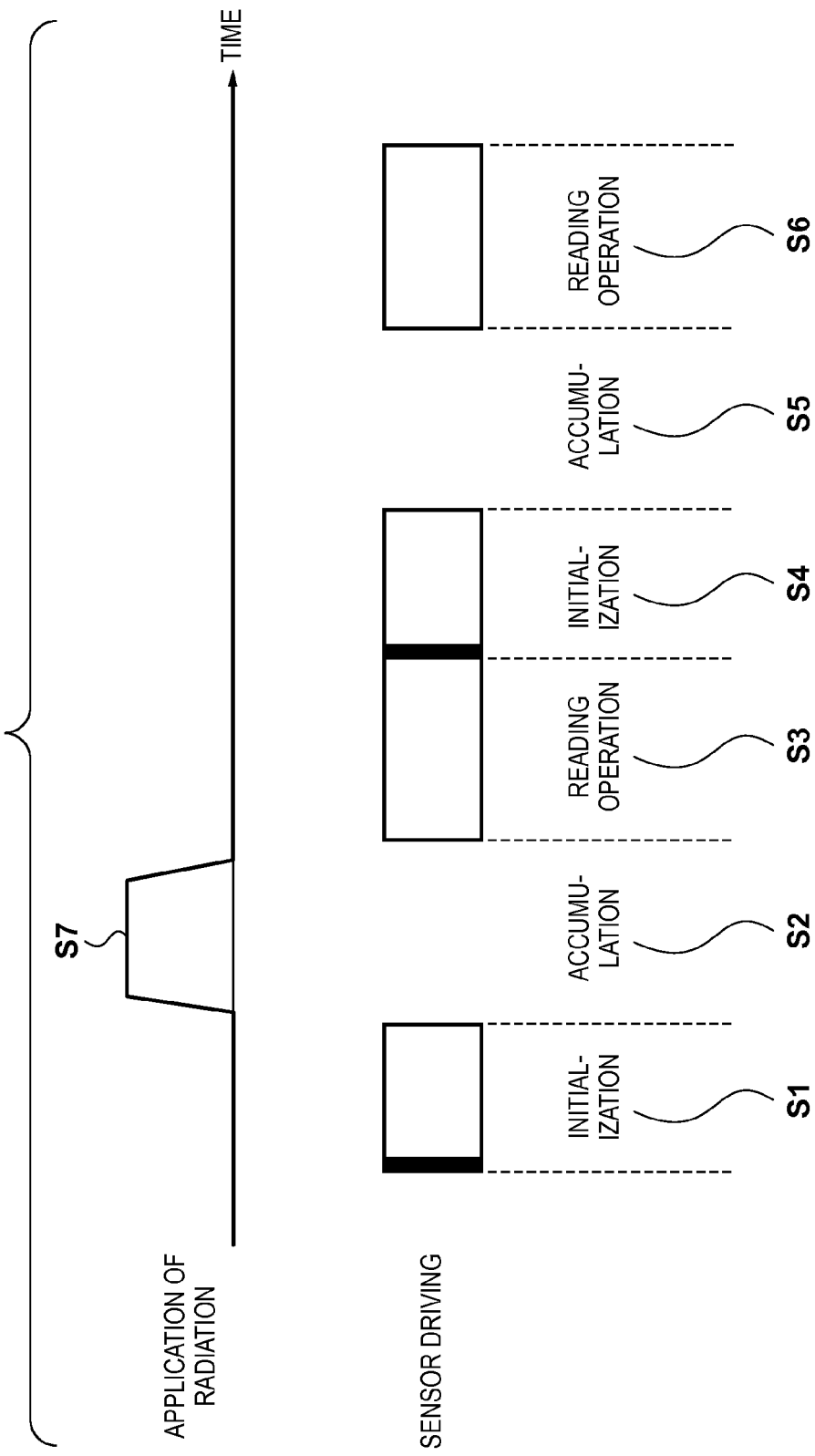
FIG. 1 is a view showing a general radiation image capturing sequence.
Figure 2:
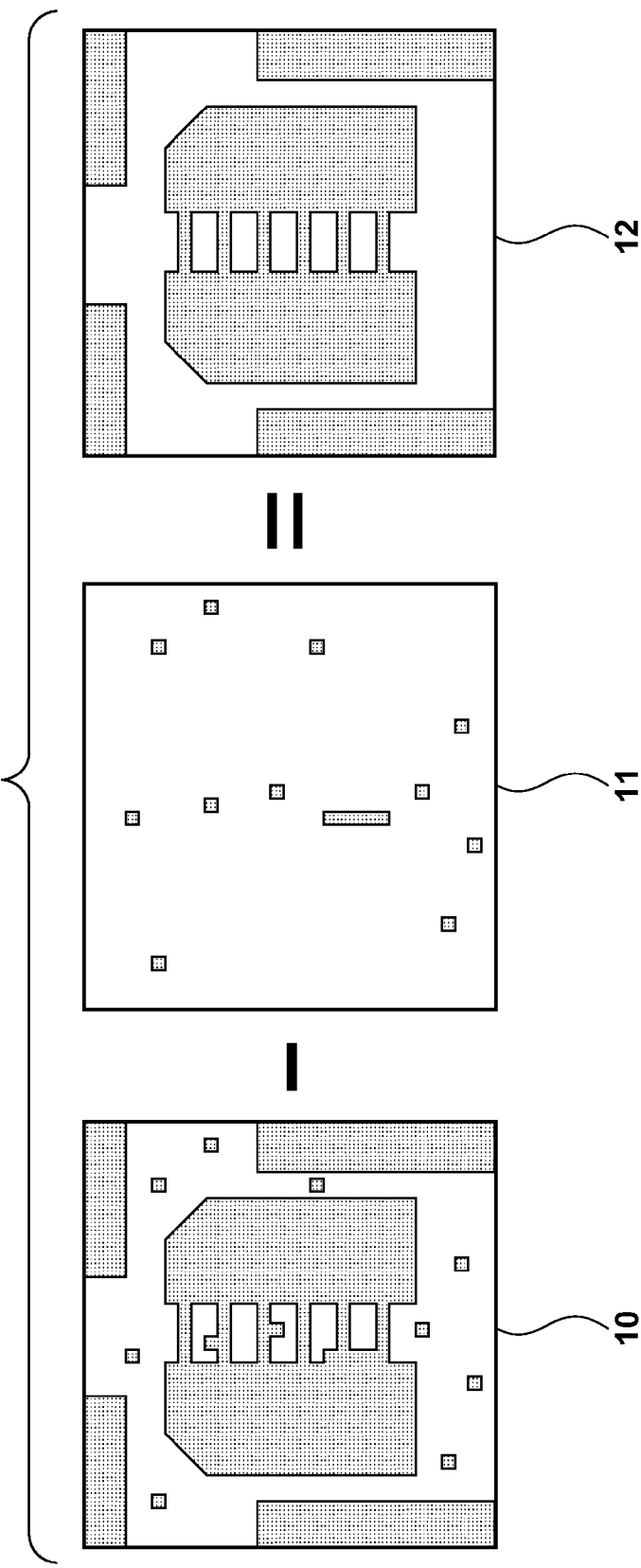
FIG. 2 is a view for explaining a general technique of removing dark current components by subtraction processing.
Figure 3:
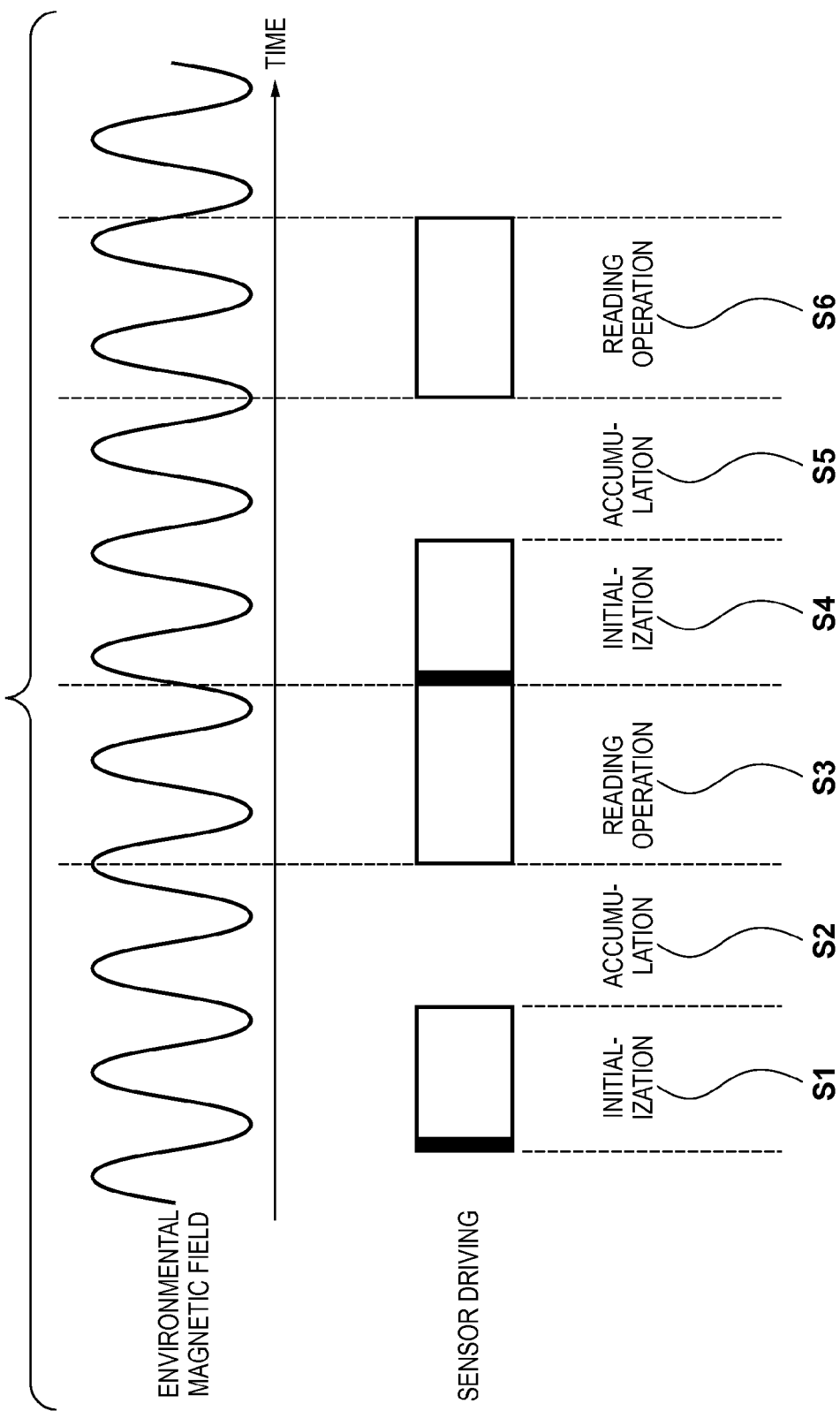
FIG. 3 is a view showing that the phase relationship between an imaging sequence and an AC magnetic field.
Figure 4:
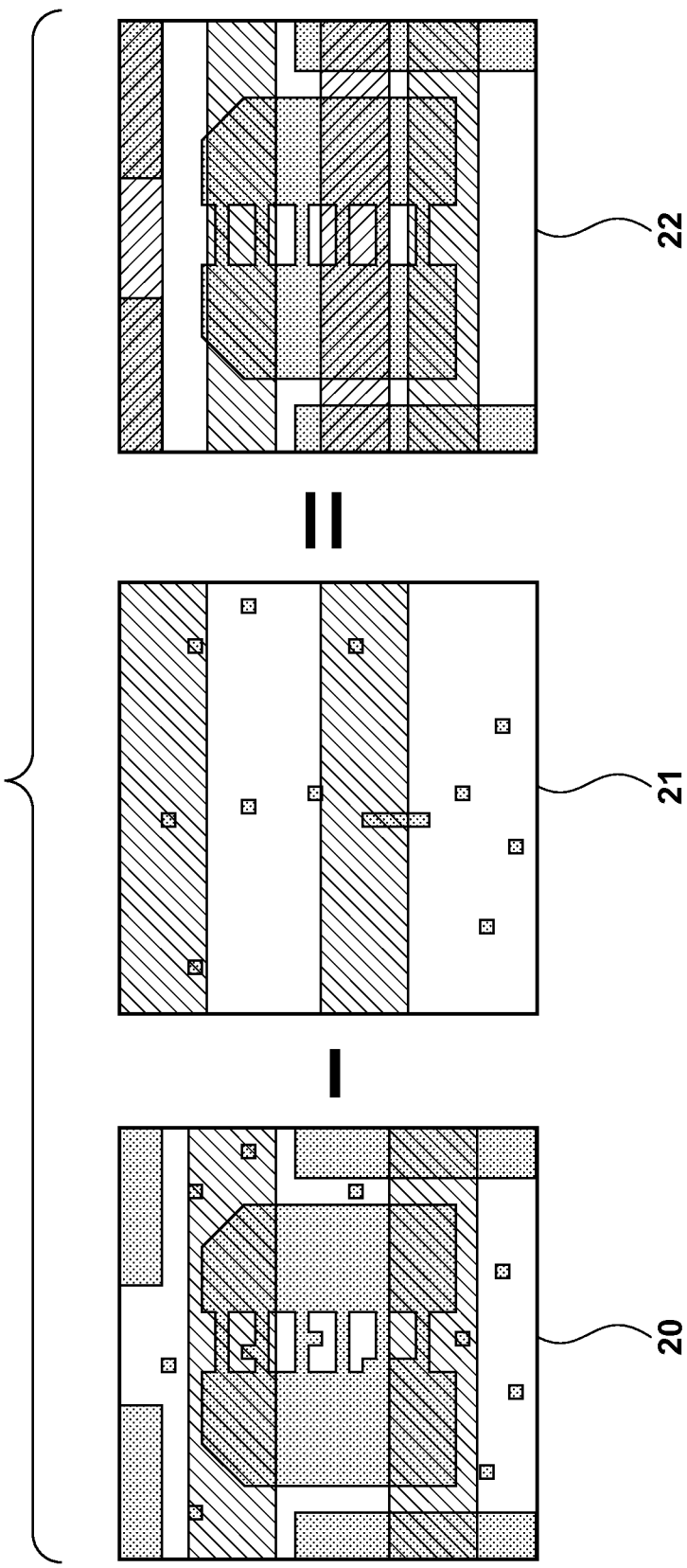
FIG. 4 is a view for explaining that fringe patterns due to a magnetic field remain after subtraction processing.
Figure 5:
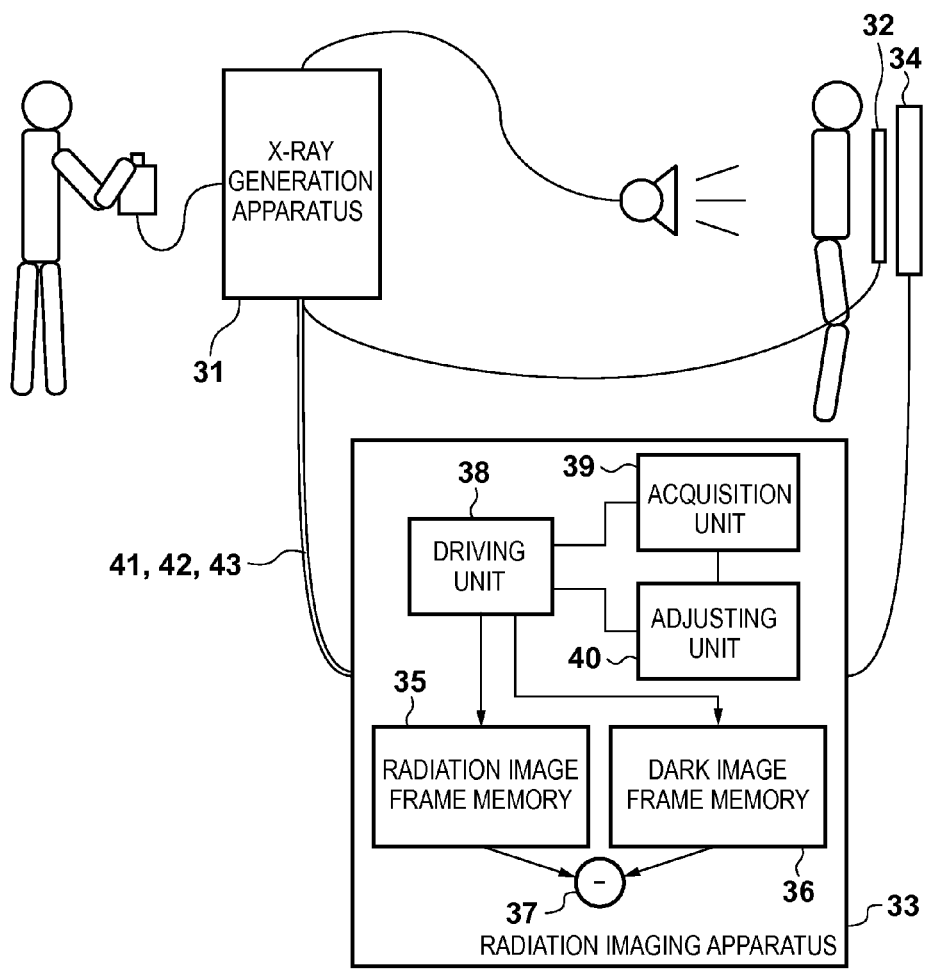
FIG. 5 is a view showing the arrangement of a radiation imaging apparatus according to an embodiment.

FIG. 5 shows an example of the arrangement of a radiographic imaging system according to the first embodiment. This embodiment will exemplify a radiographic imaging system using an X-ray generation apparatus 31 as a radiation generation apparatus which generates radiation, and a sensor array 34 which detects the irradiating dose of X-rays as a sensor which accumulates charge corresponding to the irradiating dose of radiation on a detection surface. In the radiographic imaging system of this embodiment, the X-ray generation apparatus 31 and the sensor array 34 are connected to a radiation imaging apparatus 33. The X-rays applied from the X-ray generation apparatus 31 are transmitted through an object. The sensor array 34 then receives the X-rays to obtain an image of the object. The radiation imaging apparatus 33 controls the sensor array 34. The radiation imaging apparatus 33 also performs A/D conversion and visualization of an output signal from the sensor array 34. The radiation imaging apparatus 33 includes a radiation image frame memory 35 and a dark image frame memory 36, which respectively store the radiation image and dark image acquired by scanning the sensor array 34. A correction unit 37 subtracts the acquired dark image from the acquired radiation image to obtain a radiation captured image from which the influences of dark currents are removed.

A driving unit 38 drives the sensor array 34 to execute initialization in the sensor array 34, charge accumulation, and reading of accumulated charge. An acquisition unit 39 acquires a radiation image by causing the driving unit 38 to execute driving upon generation of radiation by the X-ray generation apparatus 31. The acquisition unit 39 also acquires a dark image by causing the driving unit 38 to execute driving without generation of radiation. An adjusting unit 40 performs timing adjustment such that the time difference between the start of reading charge from the sensor array 34 by the driving unit 38 for a radiation image and the start of reading charge by the driving unit 38 for a dark image is always set to an integer multiple of a predetermined time.

The X-ray generation apparatus 31 is connected to the radiation imaging apparatus 33 via exposure synchronization signal lines. The X-ray generation apparatus 31 transmits an exposure request signal 41 to the radiation imaging apparatus 33 via these exposure synchronization signal lines. The radiation imaging apparatus 33 (driving unit 38) transmits an exposure permission signal 42 to the X-ray generation apparatus 31 via the exposure synchronization signal lines. A phototimer 32 is inserted between the object and the sensor array 34. The phototimer 32 is connected to the X-ray generation apparatus 31. The X-ray generation apparatus 31 monitors an incident dose with the phototimer. The X-ray generation apparatus 31 interrupts exposure operation when the incident dose to the sensor array 34 reaches a predetermined value. The X-ray generation apparatus 31 notifies the radiation imaging apparatus 33 of the end of exposure operation (or the interruption of exposure operation) by disabling (stopping) the exposure request signal 41.

Figure 6:
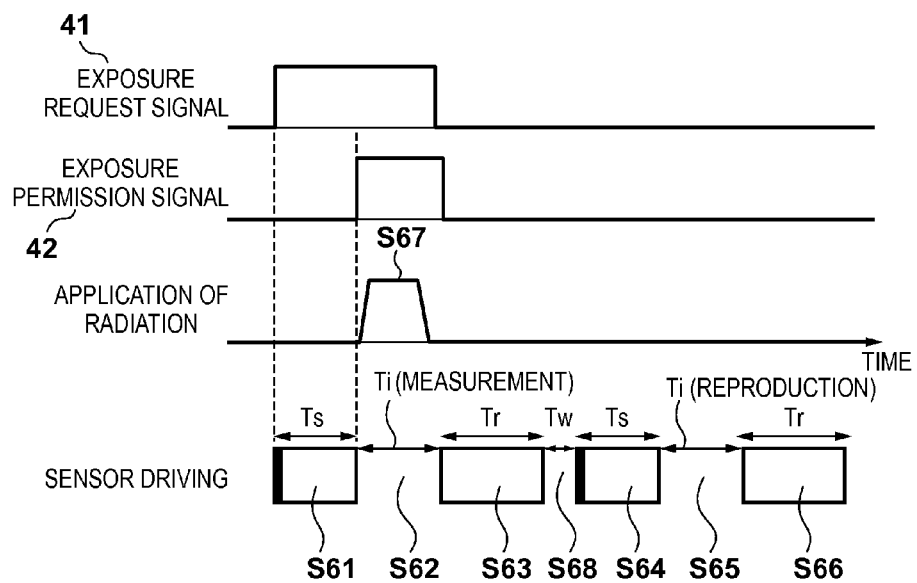
FIG. 6 is a view showing an imaging sequence in this embodiment.

The operation sequence of the imaging system will be described next with reference to the timing chart of FIG. 6 and the flowchart of FIG. 9. FIG. 9 is a flowchart for explaining the operation of the radiation imaging apparatus 33.

When the operator presses the exposure button of the X-ray generation apparatus 31, the radiation imaging apparatus 33 starts imaging operation. Upon detecting the pressing of the exposure button, the X-ray generation apparatus 31 transmits the exposure request signal 41 to the radiation imaging apparatus 33. Upon receiving this exposure request signal, the acquisition unit 39 of the radiation imaging apparatus 33 advances the process from step S901 to step S902 to cause the driving unit 38 to sensor array initialization operation (S61) for radiation image acquisition. Note that since an effective image cannot be obtained even by application of X-rays during this initialization operation, the acquisition unit 39 does not start the X-ray generation apparatus 31 during this period.

When the initialization operation is complete, the acquisition unit 39 transmits the exposure permission signal 42 to the X-ray generation apparatus 31 to start X-ray exposure operation in step S903. At the same time, the acquisition unit 39 causes the driving unit 38 to function so as to start charge accumulation (S62) using the sensor array 34. At the same time, the radiation imaging apparatus 33 starts the accumulation time measuring timer for the measurement of an accumulation time. In step S904, the acquisition unit 39 waits for the completion of exposure operation by the X-ray generation apparatus 31 (the cessation of the exposure request signal 41). Upon receiving the exposure permission signal 42 from the radiation imaging apparatus 33, the X-ray generation apparatus 31 starts X-ray exposure operation (S67). During the X-ray exposure operation, the X-ray generation apparatus 31 monitors the intensity of the X-rays via the phototimer 32.

There are a plurality of triggers to cause the X-ray generation apparatus 31 to finish the exposure operation. One of the triggers is when the maximum exposure time set in the X-ray generation apparatus 31 has elapsed. The exposure time in this case is the longest time. The next trigger is when the integral value of incident X-rays calculated by the phototimer 32 reaches a predetermined value. This trigger to finish exposure operation is the most standard trigger. Although it is rare in a normal usage, when the operator releases the exposure button, the X-ray generation apparatus 31 finishes the exposure operation. In any case, the X-ray generation apparatus 31 notifies the radiation imaging apparatus 33 of the end of exposure operation by stopping the exposure request signal 41. Although this embodiment uses the cessation of the exposure request signal 41 to notify the radiation imaging apparatus 33 of the cessation of exposure operation in the X-ray generation apparatus 31, the present invention is not limited to this. For example, it is possible to separately use a signal indicating the end of exposure operation.

Upon cessation of the exposure request signal 41, the radiation imaging apparatus 33 stops the accumulation time measuring timer which has started in step S903. In step S905, the acquisition unit 39 determines an earned value Ti of the time (accumulation time) required for charge accumulation (S62) for radiation image acquisition from the measured value of the accumulation time measuring timer. In step S906, the driving unit 38 starts reading a radiation image from the sensor array 34 (S63). At this time, the adjusting unit 40 calculates a waiting time Tw to be inserted after the radiation image is read.

The purpose of waiting for the time Tw is to adjust the time difference between the start of reading a radiation image (S63) and the start of reading a dark image (S66) to an integer multiple of a predetermined time Tc. Assume that the accumulation time for the acquisition of a dark image is equal to the above measured accumulation time Ti for the acquisition of a radiation image. Therefore, letting Tr be the time required to read signals from the sensor array 34 (S63) and Is be the time required for initialization operation (S64), the time difference between the reading of a radiation image and the reading of a dark image is expressed by Tr+Tw+Ts+Ti. Therefore, to adjust this time to an integer multiple of Tc is to satisfy Tw given below:

$$Tr+Tw+Ts+Ti=n \times Tc$$

In this equation, since n is a natural number and the waiting time cannot be a negative value, Tw≥0. The time Tr required for reading operation and the time Ts required for reading operation are constants, and Ti has already been measured as described above. In addition, in order to minimize dark current drifts, the smaller Tw, the better. That is, it is preferable to adjust the above time difference to the shortest time, among times of integer multiples of the predetermined time Tc, which is equal to or more than the time required between the start of reading a radiation image and the start of reading a dark image. It is possible to determine the waiting time Tw based on the above conditions.

The radiation imaging apparatus 33 stores the image read from the driving unit 38 in step S906 in the radiation image frame memory 35. In step S907, the adjusting unit 40 then causes the driving unit 38 or the acquisition unit 39 to wait for the calculated time Tw (S68). When the waiting time Tw has elapsed, the acquisition unit 39 performs initialization operation (S64) for dark image acquisition with respect to the sensor array 34 via the driving unit 38 in step S908. Subsequently, in step S909, the radiation imaging apparatus 33 performs accumulation operation (S65) using the sensor array 34 for a dark image. This period continues by the same time as the accumulation time Ti measured in the above manner. Upon performing accumulation operation for a dark image by Ti, the driving unit 38 reads a dark image (S66) in step S910, and stores the obtained dark image in the dark image frame memory 36. Thereafter, in step S911, the correction unit 37 calculates the difference between the contents of the two frame memories 35 and 36 (the difference between a radiation image and a dark image), and obtains a target image (captured image).

Figure 7:
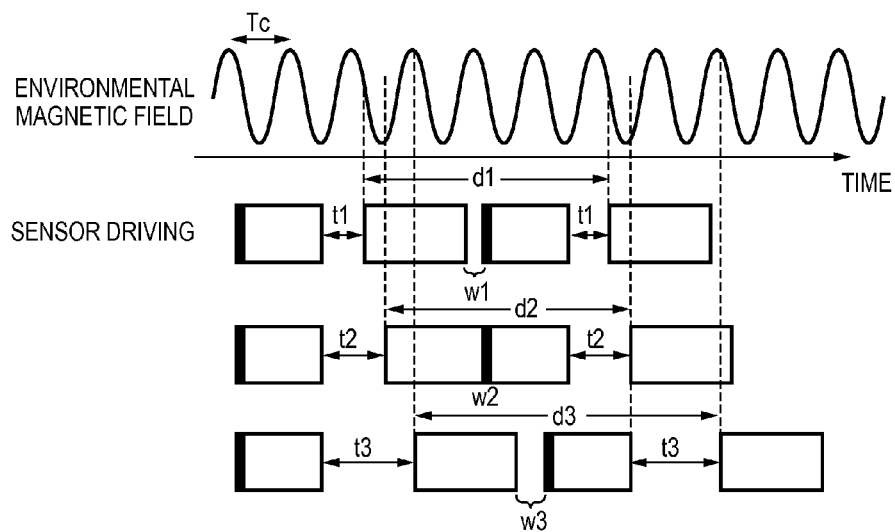
FIG. 7 is a view for explaining adjustment of an image reading timing according to the first embodiment.

The operation and effect of this apparatus when the predetermined time Tc is matched with an AC magnetic field variation period in an ambient environment will be described with reference to FIG. 7. As described above, the accumulation time Ti varies in each imaging operation, and hence is dynamically determined. FIG. 7 shows the comparison between three cases in which the accumulation time Ti varies to t1, t2, and t3, respectively.

In the case in which accumulation time Ti=t1, inserting waiting time Tw=w1 adjusts a time difference d1 between the start of reading a radiation image and the start of reading a dark image to 4×Tc.

In the case in which accumulation time Ti=t2, as in the above case, a time difference d2 between the start of reading a radiation image and the start of reading a dark image to 4×Tc. In this case, however, waiting time Tw=w2 to be inserted is 0.

In the case in which accumulation time Ti=t3, since Tw cannot be a negative value, it is impossible to adjust a time difference d3 to 4×Tc. For this reason, d3 is adjusted to 5×Tc.

In either of the above cases, the apparatus starts reading a radiation image and a dark image in the same phase of a periodic environmental magnetic field. Therefore, artifacts due to magnetic field variations are superimposed on the radiation image and the dark image in the same phase. Therefore, subtracting the radiation image and the dark image from each other will remove the artifacts due to an environmental magnetic field.

Note that the proper value of the predetermined time Tc depends on the frequency of an ambient AC magnetic field (periodic environmental magnetic field). For this reason, the user may be allowed to set the value of Tc as an operation parameter for the radiation imaging apparatus 33. The value of Tc is determined based on, for example, the frequency of a commercial power source in a place where the radiographic imaging system is installed (especially a place where the sensor array 34 is installed) or the number of revolutions of an engine or motor existing near the radiation imaging apparatus, and is stored in a nonvolatile memory in the radiation imaging apparatus at the time of installation of the radiographic imaging apparatus. Once the radiographic imaging system is installed, it is rarely moved. For this reason, it is possible to set the predetermined time Tc as a semi-fixed operation parameter at the time of installation of the apparatus.

According to the description of FIG. 7, Tc is matched with one period of an AC magnetic field. However, the present invention is not limited to this. The intended effect can be obtained as long as two reading operations for a radiation image and a dark image are performed in the same phase of an environmental magnetic field. Obviously, therefore, Tc can be set to an integer multiple of an AC magnetic field period.

In addition, for example, in Japan, the frequency of a commercial power source is 50 Hz or 60 Hz, and hence it is possible to obtain the effect of the present invention while omitting the operation of changing settings depending on a place where the apparatus is installed, by setting Tc to 1/10 sec, that is, 100 msec, which is a common multiple of 1/50 sec and 1/60 sec.

In an installation environment in which a magnetic field intersecting the imaging apparatus varies little, providing the apparatus with a mode of performing the same operation as that of a conventional apparatus is an application suitable for improving the processing efficiency because of no insertion of a waiting time. It is therefore possible to provide a mode of calculating the waiting time Tw and inserting it between the reading operation for a radiation image and reading operation for a dark image and a mode of fixing the waiting time Tw to 0 and to allow the user to choose to make the function of the adjusting unit 40 active/inactive.

Second Embodiment

The first embodiment has exemplified the arrangement which performs control, in an operation sequence of acquiring a dark image after the acquisition of a radiation image, to set the time difference between the start of reading the radiation image and the start of reading the dark image to an integer multiple of a period of an environmental magnetic field. The second embodiment will exemplify an application of the present invention to an operation sequence of acquiring a dark image before a radiation image. The arrangement of a radiographic imaging system according to the second embodiment is the same as that of the first embodiment (FIG. 5). The operation sequence of the second embodiment will be described with reference to FIGS. 8 and 10.

The second embodiment is configured to periodically acquire dark images before capturing of radiation images and store the acquired images in a dark image frame memory 36 (steps S1001 to S1005). This operation will be called idling. Every time the operation of reading a dark image starts, a timer is reset and started to measure an elapse time d from the latest dark image acquisition time (the start time of reading a dark image).

That is, a driving unit 38 performs initialization processing for dark image acquisition with respect to a sensor array 34 in step S1001 under the control of an acquisition unit 39. In step S1002, the sensor array 34 performs accumulation processing for a predetermined time. In steps S1003 and S1004, the acquisition unit 39 resets and starts the elapse time measuring timer for measuring an elapse time from the start of reading signals from the sensor array 34 (S81 in FIG. 8), and causes the driving unit 38 to read signals from the sensor array 34 to obtain a dark image. The above processing in steps S1001 to S1004 is periodically executed, and idling state is continued until the operator presses the exposure button (an exposure request signal 41 is received; S1005 and S1006).

The apparatus starts imaging operation upon operation by the operator as in the first embodiment. The driving unit 38 and the acquisition unit 39 perform initialization operation for the sensor array upon reception of the exposure request signal 41, perform exposure operation, and finish the exposure operation. This processing is the same as that in the first embodiment (S1006 to S1009). Note, however, that the second embodiment uses no accumulation time measuring timer. That is, upon receiving the exposure request signal 41, the driving unit 38 executes initialization processing for the sensor array 34 for the acquisition of a radiation image in step S1007. Upon completion of the initialization processing, a radiation imaging apparatus 33 transmits an exposure permission signal 42 to an X-ray generation apparatus 31 to start X-ray exposure operation, and the sensor array 34 starts accumulating charge in step S1008. When the exposure operation ends under the same condition as that in the first embodiment, the cessation of the exposure request signal 41 is detected. The process then advances from step S1009 to step S1010.

Unlike the first embodiment, the second embodiment does not read signals from the sensor array 34 immediately after the end of exposure operation. Instead, an adjusting unit 40 delays the start of reading operation by the driving unit 38 while monitoring an elapse time d measured by the above elapse time measuring timer (that is, causes the sensor array 34 to continue accumulation even after the exposure operation). When the value indicated by the elapse time measuring timer, that is, the elapse time d, becomes an integer multiple of a predetermined time Tc described in the first embodiment, the driving unit 38 starts reading a radiation image (S83) (steps S1010 and S1011). In step S1012, the correction unit 37 corrects (performs subtraction processing) the radiation image by using the dark image to obtain a radiation captured image.

Note that delaying the start of reading signals from the sensor array 34 will prolong the accumulation time at the time of the acquisition of a radiation image. As in the first embodiment, therefore, the apparatus may be configured to measure in advance an accumulation time at the time of the acquisition of a radiation image by using the accumulation time timer and make the correction unit 37 change a correction parameter in accordance with the accumulation time when performing correction using the dark image acquired by idling.

FIG. 8 shows that the period of S82 extends from initialization operation for the acquisition of a radiation image to the completion of radiation exposure operation. FIG. 8 shows how the start timing of reading signals from the sensor array 34 after adjustment varies (how the start timing is adjusted to different integer multiples of the predetermined time Tc) depending on the timing of the exposure request signal 41 although the exposure time remains the same. The periods indicated by d1 to d3 each indicate the period from the start of reading operation for a dark image to the start of reading operation for a radiation image. The periods d1 and d2 are each equal to six times Tc. In contrast to this, the period d3 is a period (d3=7×Tc) seven times Tc because the timing of the exposure request signal 41 is too late to start reading operation for a radiation image in the period of 6×Tc. FIG. 8 shows how the driving timing is adjusted in accordance with the timing of an exposure request. Obviously, however, the adjusting unit 40 properly functions by setting different exposure periods required for capturing radiation images (setting different periods of S82).

As described above, in the second embodiment as well, since the time difference between the start of reading a dark image and the start of reading a radiation image is set to an integer multiple of the predetermined time Tc, artifacts due to magnetic field variations are superimposed on the radiation image and the dark image in the same phase. Therefore, subtracting the radiation image and the dark image from each other will remove the artifacts due to a periodic environmental magnetic field.

Although the two embodiments have been described above, simultaneously executing them can implement a further embodiment. That is, this embodiment is configured to obtain the first target image using a dark image acquired at the time of idling and obtain the second target image using a dark image acquired after imaging. Obviously, adjusting the time difference between the radiation image and the dark image to a multiple of Tc will remove artifacts from both the first target image and the second target image.

As described above, according to each embodiment described above, since artifacts due to variations in periodic environmental magnetic field are superimposed on both a radiation image and a dark image in the same phase, it is possible to obtain the effect of reducing the artifacts by subtraction processing.

Aspects of the present invention can also be realized by a computer of a system or apparatus (or devices such as a CPU or MPU) that reads and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-265430, filed Nov. 29, 2010, which is hereby incorporated by reference herein in its entirety.

What is claimed is:

1. A control apparatus for controlling a radiation imaging by a radiation generation apparatus which generates radiation and a sensor which accumulates charge corresponding to an irradiated radiation dose, the control apparatus comprising:
   a first acquisition unit configured to acquire a radiation image corresponding to radiation irradiated by the radiation generation apparatus by reading an electrical signal corresponding to the charge accumulated in the sensor;
   a second acquisition unit configured to acquire dark current data of the sensor by reading an electrical signal corresponding to the charge accumulated in the sensor without irradiating radiation; and
   an adjusting unit configured to adjust a driving timing of the sensor by one of said first acquisition unit and said second acquisition unit so as to set a time difference between two starts of reading an electrical signal from the sensor by said first acquisition unit and reading an electrical signal from the sensor by said second acquisition unit to an integer multiple of a period determined by a frequency of a commercial power source.

2. The apparatus according to claim 1, wherein said adjusting unit adjusts the timing so as to set the time difference to a time which is not less than a time required between the two starts of reading and is a shortest time among times of integer multiples of the predetermined time.

3. The apparatus according to claim 1, further comprising an accumulation time measuring unit configured to measure a charge accumulation time required to obtain the radiation image,
   wherein when the dark image is to be acquired after acquisition of the radiation image, said adjusting unit sets, based on the measured time, a waiting time required to set the time difference to an integer multiple of the period between driving of the sensor by said first acquisition unit and driving of the sensor by said second acquisition unit.

4. The apparatus according to claim 1, further comprising an elapse time measuring unit configured to measure an elapse time from the start of reading by said second acquisition unit,
wherein when the radiation image is to be acquired after acquisition of the dark image, said adjusting unit delays the start timing of reading by said first acquisition unit to set the elapse time to an integer multiple of the period.

5. The apparatus according to claim 1, wherein said adjusting unit adjusts the timing so as to set the time difference to a least common multiple of a plurality of periods determined by frequencies of a plurality of commercial power sources.

6. The apparatus according to claim 1, further comprising a setting unit configured to set the time difference in accordance with an operation input from a user.

7. The apparatus according to claim 1, further comprising a switching unit configured to switch whether to execute timing adjustment by said adjusting unit.

8. A method of controlling a radiation imaging by a radiation generation apparatus which generates radiation and a sensor which accumulates charge corresponding to an irradiating dose on a detection surface, the method comprising:
   a first acquisition step of acquiring a radiation image by driving the sensor upon generation of radiation by the radiation generation apparatus;
   a second acquisition step of acquiring a dark image by driving the sensor without generation of radiation by the radiation generation apparatus; and
   an adjusting step of adjusting a driving timing of the sensor in one of the first acquisition step and the second acquisition step so as to set a time difference between two starts of reading an electrical signal from the sensor in the first acquisition step and reading an electrical signal from the sensor in the second acquisition step to an integer multiple of a predetermined time.

9. A non-transitory computer-readable storage medium storing a program for causing a computer to execute the method according to claim 8.

10. The apparatus according to claim 1, wherein said adjusting unit is configured to adjust the timing so as to set the time difference to an integer multiple of 100 msec.

11. The apparatus according to claim 1, further comprising a measuring unit configured to measure a time in which the sensor is in a state of accumulating charge in acquiring the radiation image, and wherein said adjusting unit is configured to cause at least one of sensors to be adjusted by said first acquisition unit and said second acquisition unit based on the measured time.

12. The apparatus according to claim 1, wherein reading of an electrical signal from the sensor by said first acquisition unit and reading of an electrical signal from the sensor by said second acquisition unit are performed in the same time.

13. A control apparatus for controlling a radiation imaging by a radiation generation apparatus which generates radiation and a sensor which accumulates charge corresponding to an irradiated radiation dose, the control apparatus comprising:
   a driving unit configured to have the sensor perform a first drive and a second drive, where the first drive is to read an electrical signal corresponding to charge accumulated in the sensor and the second drive is to read an electrical signal corresponding to charge accumulated in the sensor in a different timing from the first drive; and
   an image acquiring unit configured to acquire third image data based on first image data based on the electrical signal read by the first drive and second image data based on the electrical signal read by the second drive,
   wherein said driving unit has the sensor perform the first drive and the second drive so that a phase of an AC power supply that operates in a predetermined frequency when reading of the electrical signal in the first drive is started and a phase of an AC power supply that operates when reading of the electrical signal in the second drive is started are the same phase.

14. The apparatus according to claim 13, further comprising an adjusting unit configured to adjust a driving timing of at least one of the first drive and the second drive so as to set a time difference between two starts of the reading in the first drive and the reading in the second drive to an integer multiple of a period determined by a frequency of a commercial power source.

15. The apparatus according to claim 13, further comprising a time obtaining unit configured to obtain one of a first time and a second time, the first time required for the first driving and the second time required for the second time.

16. The apparatus according to claim 15, further comprising an adjusting unit configured to adjust a timing of the first drive or that of the second drive based on the obtained time.

17. The apparatus according to claim 16, wherein said adjusting unit delays at least one of starts of reading the electrical signal in the first drive and the second drive so as to set a time difference between two start of the reading in the first drive and the reading in the second drive to an integer multiple of a period determined by a frequency of a commercial power source.

18. The apparatus according to claim 15, wherein said time obtaining unit measures, for obtaining the one of the first time and the second time, a time in which the sensor is in a state of accumulating charge in acquiring the radiation image.

19. The apparatus according to claim 13, wherein said driving unit has the sensor perform the first drive and the second drive so as to set a time difference between two start of the reading in the first drive and the reading in the second drive to an integer multiple of 100 msec.

20. The apparatus according to claim 13, further comprising a setting unit configured to set a time in accordance with an operation input from a user, and wherein said driving unit adjusts the timing so as to set a time difference between two start of the reading in the first drive and the reading in the second drive to an integer multiple of the time set by said setting unit.

21. The apparatus according to claim 13, wherein said driving unit has the sensor perform the first drive and the second drive, where the first drive is to read an electrical signal corresponding to charge accumulated in the sensor corresponding to irradiated radiation dose from the radiation generation apparatus in order to acquire radiation image and the second drive is to read an electrical signal corresponding to charge accumulated in the sensor in order to acquire dark current data.

22. A control system for controlling a radiation imaging by a radiation generation apparatus which generates radiation and a sensor which accumulates charge corresponding to an irradiated radiation dose, the system comprising:
   a first acquisition unit configured to acquire a radiation image corresponding to radiation irradiated by the radiation generation apparatus by reading an electrical signal corresponding to the charge accumulated in the sensor;
   a second acquisition unit configured to acquire a dark current data of the sensor by reading an electrical signal corresponding to the charge accumulated in the sensor without irradiating radiation; and
   an adjusting unit configured to cause a driving timing of the sensor to be adjusted by one of said first acquisition unit and said second acquisition unit so as to set a time difference between two starts of reading an electrical signal from the sensor by said first acquisition unit and reading an electrical signal from the sensor by said second acquisition unit to an integer multiple of a period determined by a frequency of a commercial power source.

23. A control system for controlling a radiation imaging by a radiation generation apparatus which generates radiation and a sensor which accumulates charge corresponding to an irradiated radiation dose, the system comprising:
   a driving unit configured to have the sensor perform a first drive and a second drive, where the first drive is to read an electrical signal corresponding to charge accumulated in the sensor and the second drive is to read an electrical signal corresponding to charge accumulated in the sensor in a different timing from the first drive; and
   an image acquiring unit configured to acquire third image data based on first image data based on the electrical signal read by the first drive and second image data based on the electrical signal read by the second drive,
   wherein said driving unit has the sensor perform the first drive and the second drive so that a phase of an AC power supply that operates in a predetermined frequency when reading of the electrical signal in the first drive is started and a phase of an AC power supply that operates when reading of the electrical signal in the second drive is started are the same phase.

24. A method for controlling a control apparatus for controlling a radiation imaging by a radiation generation apparatus which generates radiation and a sensor which accumulates charge corresponding to an irradiated radiation dose, the method comprising:
   a driving step of having the sensor perform a first drive and a second drive, where the first drive is to read an electrical signal corresponding to charge accumulated in the sensor and the second drive is to read an electrical signal corresponding to charge accumulated in the sensor in a different timing from the first drive; and
   an image acquiring step for acquiring third image data based on first image data based on the electrical signal read by the first drive and second image data based on the electrical signal read by the second drive,
   wherein, in the driving unit, the first drive and the second drive are performed so that a phase of an AC power supply that operates in a predetermined frequency when reading of the electrical signal in the first drive is started and a phase of an AC power supply that operates when reading of the electrical signal in the second drive is started are the same phase.

* * * * *